United States Patent [19]
Pelat et al.

[11] 4,271,935
[45] Jun. 9, 1981

[54] INERTIAL DEVICE TO PREVENT AND PERMIT MOTION BETWEEN TWO MEMBERS

[75] Inventors: Roger P. Pelat, Paris; Gildas Le Pierres, La Ferte Alais, both of France

[73] Assignee: International Vibration Engineering, Boutigny sur Essonne, France

[21] Appl. No.: 892,849

[22] Filed: Apr. 3, 1978

[30] Foreign Application Priority Data

Apr. 7, 1977 [FR] France .................................. 77 10608

[51] Int. Cl.³ ............................................... B60T 8/12
[52] U.S. Cl. ................................. 188/185; 188/1 B; 176/365; 176/38
[58] Field of Search ...................... 176/36 R, 36 S, 37, 176/38, 87; 188/1 R, 1 B, 180, 271, 297, 185

[56] References Cited

U.S. PATENT DOCUMENTS

| 3,089,839 | 5/1963 | Hawke et al. | 176/36 R |
| 3,107,752 | 10/1963 | McLean | 188/1 B |
| 3,547,235 | 12/1970 | Weinrich et al. | 188/271 |
| 3,791,498 | 2/1974 | Wassermann | 188/271 |
| 3,809,186 | 5/1974 | Suozzo | 188/1 B |
| 3,823,619 | 7/1974 | Shotwell | 188/1 B |
| 3,876,040 | 4/1975 | Yang | 188/1 B |
| 3,911,199 | 10/1975 | Fischer | 188/1 B |
| 3,983,965 | 10/1976 | Wright, Jr. | 188/1 B |
| 4,054,186 | 10/1977 | Banks, Jr. et al. | 188/1 B |
| 4,105,098 | 8/1978 | Klimaitis | 188/1 B |

Primary Examiner—S. A. Cangialosi
Attorney, Agent, or Firm—Brisebois & Kruger

[57] ABSTRACT

The present invention relates to an inertial device to permit and to prevent motion between two members, for example, the tubing and the body of a central reactor in a thermal or nuclear power station.

7 Claims, 4 Drawing Figures

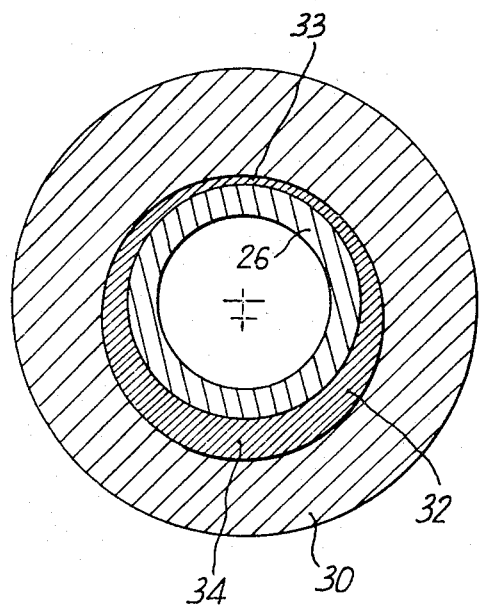
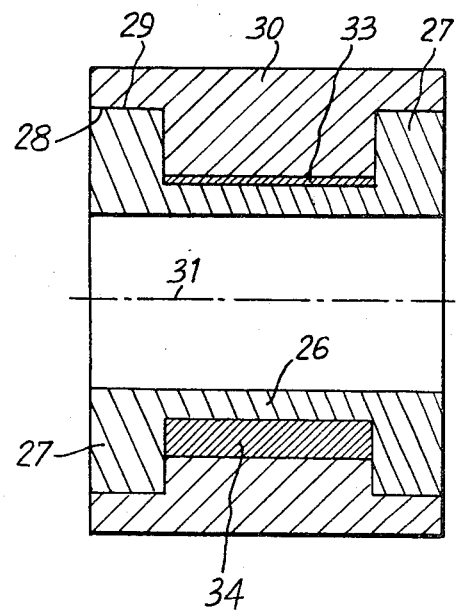

INERTIAL DEVICE TO PREVENT AND PERMIT MOTION BETWEEN TWO MEMBERS

A device is already known which permits and prevents relative movement between two members, for example, between tubing of a nuclear central power station and a structure supporting the tubing, as a function of the magnitude of the acceleration of this movement and comprises:

a casing joined to one of the members, an element joined to the other member capable of sliding axially through the casing without rotating, a rotative element having great inertia capable of being put in rotation by a movement of the first member and to oppose the movement when its rotation is prevented. The rotative element has two abutment surfaces capable of being applied against corresponding abutment surfaces of the casing, after a relative axial movement between the rotative element and the casing in one direction or the other to prevent its rotation. Elastic means are provided to normally keep the rotative element spaced from the one or more abutment surfaces of the casing, with the rotative element being joined to the first member in such a way as to be put in rotation by a slight acceleration movement of the first member and to be driven thereby in a relative movement toward the abutment surface of the unit against the action of the elastic means when the acceleration is greater. Preferably, the elastic means are constituted by two springs, each opposing an axial movement in one of the directions, the springs being prestressed and supporting themselves on one end on the casing and on the other end on an abutment member maintaining the prestress of the springs, with the result that in order that the rotative element can be displaced axially, it must be moved by a force greater than the prestress of that one of the springs which opposes the movement.

The invention proposes to improve such devices and to provide a device which allows, with great reliability and in an economical fashion, to obtain, when the device functions to oppose the movements of the sliding element, some movement of the sliding element while also preventing this movement from attaining great speed.

The invention likewise proposes to provide such a device which prevents the rotative element from attaining too great a speed in the case of a prolonged sliding movement.

Finally, the invention proposes, in such devices, to insure perfect functioning by avoiding total stopping when it is submitted to a continuous force, while preventing drift of the rotative element in relation to the sliding element over a period of time.

The invention has as an object a device to permit and to prevent rotative movement between two members and comprising:

a casing joined to one of the members, a threaded shaft, joined to the other member and able to slide axially through the casing without rotation, a rotative element having high inertia capable of being put in rotation by a movement of the first element and of opposing the movement when its rotation is prevented, the rotative element having two abutment surfaces capable of engaging against the corresponding abutment surfaces of the casing after a relative axial movement between the rotative element in one direction or in the other to prevent its rotation, elastic means to normally keep the rotative element spaced from the one or more abutment surfaces of the casing, the rotative element being joined to the said first element to be rotated by a movement of slight acceleration of this first element and to be moved with it in a relative movement toward the abutment surface of the casing against the elastic means when the acceleration is greater, characterized by the fact that the rotative element has surfaces capable of rotating in contact with a viscous material, for example, a grease, in order to brake the rotation of the rotative element in the case where relative rotation exists between the rotative element and a member forming the chamber filled with viscous material.

Preferably, the elastic means are constituted by two springs, each opposing an axial movement in one of the directions, the springs being prestressed and supporting themselves at one end on the casing and at the other end on an abutment surface maintaining the prestress of the spring so that in order for the rotative element to be displaced axially, it must be driven with a force greater than the prestress of that one of the springs which opposes the movement.

In a first embodiment of the invention, the rotative element has the form of a nut around which is mounted, by bearings, an auxiliary rotative member, the assembly having an annular chamber formed between the rotative element and the auxiliary member and filled with grease.

Preferably, the rotative element and/or the auxiliary element have extensions or flanges entering the chamber to increase the metallic surface area in contact with the viscous medium or the grease.

Advantageously, the abutment surfaces are formed on the auxiliary element, these abutment surfaces being preferably truncated to cooperate with the corresponding abutment surfaces of the casing.

The assembly of the rotative element and of its auxiliary element has a high inertia, so that for slightly accelerated movements of the threaded shaft, the rotative element is is rotated, driving with it the auxiliary element practically at the same speed of rotation, while in the case of greatly accelerated movements the inertia of the assembly causes the rotative element to be pushed against one of the prestressed springs with the result that one abutment surface of the auxiliary element comes in direct contact with the corresponding abutment surface of the casing. Beginning at this moment the auxiliary element is prevented from turning. However, the rotative element can still turn inside the auxiliary element, it being understood that its rotation is braked by the presence of the viscous material and increases when the rotation speed is greater.

This device allows, when a certain acceleration threshold is attained, obtaining an effective braking, this braking being all the more significant furthermore as the rotation speed of the nut, that is to say, the displacement speed of the shaft increases. Braking thus does not prevent normal motion from continuing.

In another embodiment, the rotative element is able to turn against a viscous material interposed between the rotative element, preferably at its periphery, and a stationary member such as the casing, while permitting the rotative element to move against the action of the prestressed springs. As a function of the regulation of the viscous friction it can be understood then that it is possible, if desired, that the rotative element itself no longer has an elevated inertia. Thus, in the case of a slightly accelerated but rapid movement of sliding of the shaft, the braking force applied on the rotative element, which tends to turn rapidly, is sufficient to create a reaction such that the rotative element is driven against a prestressed spring to come into abutment against the casing and to be at this instant stopped or braked. In this case one can even have a rotative element with an extremely small inertia while obtaining braking or if one wishes, a complete stopping in the case of an accelerated movement tending to drive the rotative element at great speed. It is likewise possible to give the rotative element an intermediate inertia and in this case, the stopping can be obtained both in the event of very greatly accelerated movements, and in the event of less greatly accelerated movements but at an elevated speed.

In fact, the presence of the viscous friction due to the rotation confers on the rotative element a universal inertia permitting satisfactory functioning under the required conditions.

Other advantages and characteristics of the invention will be apparent to from the following description which is a non-limiting example and which refers to the attached drawings in which:

FIGS. 3 and 4 show sectional views of another embodiment.

Figure 1:
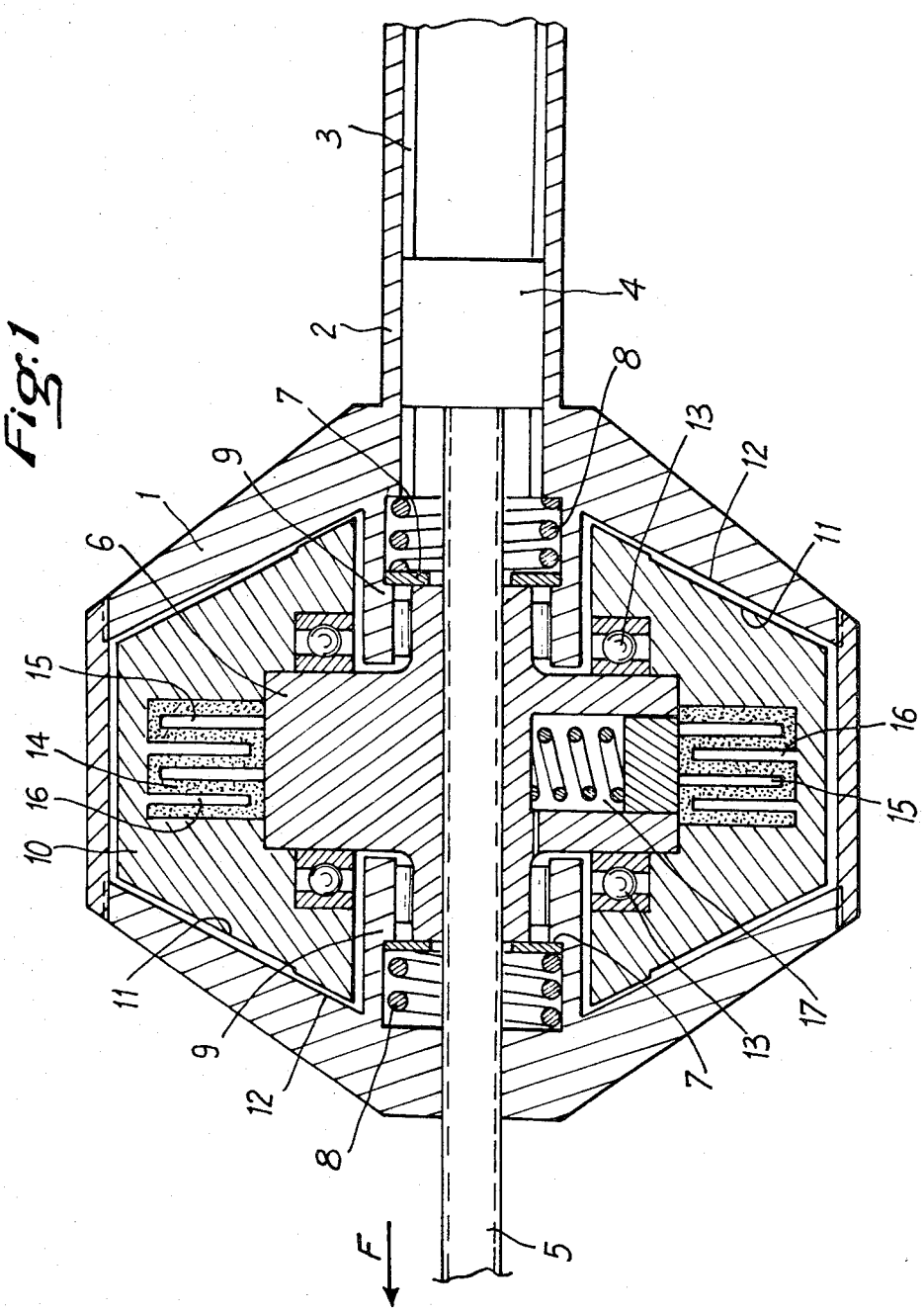
FIG. 1 shows a view in axial section of a device according to a first embodiment of the invention.

Referring to FIG. 1, the device comprises a casing 1 having a cylindrical form with two truncated extremities and having an axial extension 2 on one of its sides, through which can slide, without being able to turn due to internal grooves 3, a guide head 4 of a sliding element 5 in the form of a threaded shaft extending through unit 1. On the threaded shaft 5 is screwed a nut 6 having a corresponding thread, the nut having two axial extensions in the immediate vicinity of two washers 7 pushed back toward the nut by prestressed springs 8 which bear on the casing. The washers 7 in the position shown in FIG. 1 are prevented from going further forward toward nut 6 by stops 9 integral with the casing.

On the periphery of nut 6 is mounted an auxiliary rotative element 10 having a cylindrical periphery and two truncated convex bases 11. These bases extend parallel to and at a slight distance from the two truncated abutment surfaces 12 of the casing. Element 10 can turn in relation to nut 6 because of bearings 13 interposed between them. In addition, between the periphery of the nut 6 and the corresponding part of member 10, is disposed an annular chamber 14 filled with a viscous material such as a silicone grease. Inside of this chamber the nut 6 and the member 10 have parallel annular extensions 15, 16 to increase the viscous friction.

A compensation chamber 17, with piston and spring allow the volume of grease to adapt to the expansions of the chamber.

The operation is as follows:

When under the effect of a movement of one of the damping members, for example a tube, the sliding element 5, with its head 4, displaces itself with a relatively small acceleration in the direction of arrow F, nut 6 engages against washer 7 to the left but with an insufficient force to push back the prestressed spring 8. The nut begins then to turn on the threads of member 5 which continues its advance and rotates with it member 10, the assembly of nut 6 and member 10 forming to a degree a kind of single rotative element without notable relative movement between the two parts constituting the assembly.

The slightly accelerated movement can thus continue.

On the contrary, in the case where constantly in the direction of arrow F a greatly accelerated movement takes place exceeding a certain threshold, the inertia of the assembly 6-10 is such that a significant force is applied against washer 7 on the left, the prestressed spring is then pushed back until the left surface 11 of member 10 comes in contact with the surface 12 of the adjacent abutment. Member 10 is thus stopped and is no longer able to turn. In this position a relatively slow movement of the shaft 5 can continue. In fact, nut 6 can begin to turn under the effect of the advance of the threaded shaft 5 in the direction of arrow F, but it finds itself braked more as its speed of rotation increases, which limits the possible displacement speed.

Of course, the functioning is the same in the other direction.

In addition, tests have enabled us to ascertain that the device, in the case of alternate stressing at high frequency would not undergo any drift and would always be ready to function.

Figure 2:
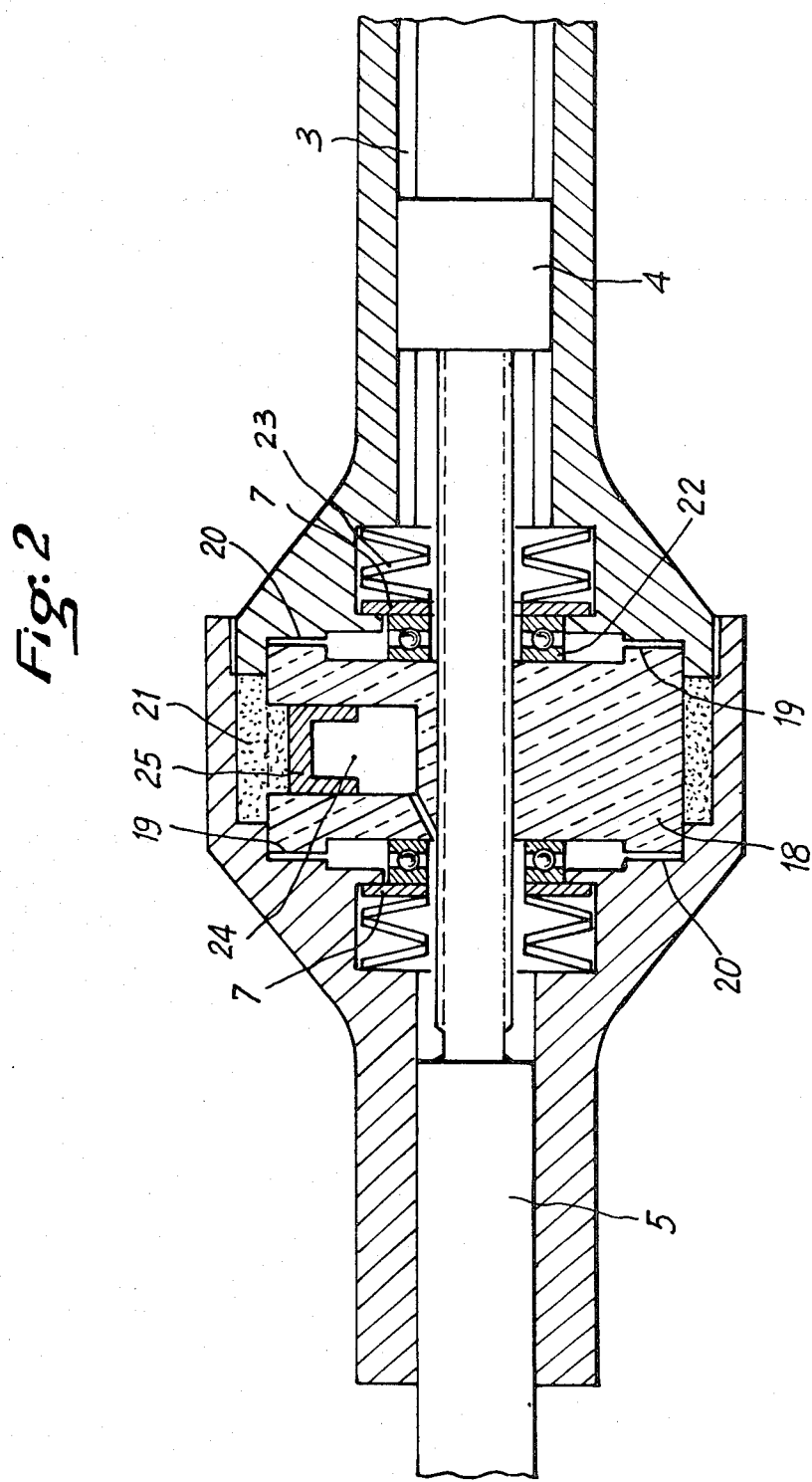
FIG. 2 shows a view in axial section of a device according to a second embodiment of the invention.

In FIG. 2 there is only a single nut 18 which has abutment surfaces 19 capable of cooperating with the abutment surfaces 20 of the casing.

The periphery of the nut forms with the corresponding part of the casing a chamber 21 which is filled with grease. When the nut turns it is braked by the viscous material shown in the chamber. Nevertheless this viscous material scarcely opposes an axial sliding displacement of the nut.

As in the preceding case, nut 18 is in contact, but here through ball bearings 22, with washers 7 pushed by prestressed springs of Belleville washers 23.

In the nut is again a radial chamber 24 with a piston 25 permitting adaptation to variations in volume of the grease disposed in the chamber 21.

When the shaft 5 is activated by a movement of translation at low speed, the nut 18 begins to turn on the thread of the shaft while being moderately braked by the grease 21 because of the slow rotation of the nut. The reaction produced is insufficient to push back the prestressed spring 23 involved. If on the other hand the sliding speed of shaft 5 increases, the nut turns more quickly and the viscous braking effect increases notably with the result that the reaction created causes the displacement of the nut with the shaft against one of the springs 23, and one of the abutment surfaces 19 comes in contact with the corresponding abutment surface 20; the nut finds itself immobilized and all subsequent movement of the shaft is prevented.

It is likewise possible to use in the device of FIG. 2, in place of a nut such as nut 18, a composite nut formed for example by a nut analogous to nut 6 and an auxiliary part analogous to member 10 and in this case in the event of rapid movement of shaft 5, the contact of the abutment surfaces occurs but a subsequent slow rotation of the nut is permissible, and a slow axial movement of the sliding element 5 is then able to continue to occur.

In FIGS. 3 and 4 the device comprises, in addition to a threaded shaft (not shown) and a casing (not shown), an internal rotative member 26 having a generally cylindrical form with two lateral cheek plates 27. These lateral cheek plates have peripheral cylindrical surfaces 28 disposed in circular recesses 29 of a peripheral member 30. Thus member 26 can turn in member 30, the surfaces 28 and 29 serving as bearings for rotation.

Members 26 and 30 are both of generally circular form and possess the same axis 31. However, in member 30 is a cylindrical recess eccentric in relation to axis 31. The space thus defined is filled by a fluid, for example, a viscous grease 32. Thus the volume taken up by this grease 32 has a narrow portion 33 where the external surfaces of element 26 and the internal surfaces of element 30 are near to each other, and an enlarged portion 34 where these surfaces are on the contrary spaced apart. When member 26 is driven in rotation around axis 31, member 30 being fixed, member 26 turns by itself and has a tendency to drive the grease in the direction corresponding to its rotation. An obstruction of the grease and an increase in pressure occurs in space 33, like in an hydrodynamic bearing. This increase in pressure in the restriction zone 33 causes a reaction tending to displace the axis of member 26 with the result that instead of turning nearly freely, the surfaces 28 of member 26, at a point opposite to that of the pressure zone, come in contact with surfaces 28 to produce an increased friction effect which increases when the rotation speed, and consequently the pressure created in zone 33 increases. Thus one can obtain braking by friction of metal on metal without the grease intervening in a predominant way in the dissipation of energy but serving simply to cause the friction. Naturally one can advantageously provide a means for compensating for temperature such as piston 25 shown in FIG. 2, this means being placed, for example, in member 30 at the enlarged zone 34.

To increase the friction surfaces, one can also have surfaces 28 and 29 conical instead of cylindrical.

The device according to the invention can be used by considering that member 26 forms the nut capable of being driven in rotation by a threaded shaft while member 30 constitutes the fixed structure. As a variation, member 26 can constitute the nut driven by the threaded shaft while member 30 can function analogous to that of member 10 with the result that for a high acceleration when member 26 is displaced axially for example against a spring analogous to spring 8, member 30, capable initially of turning in rotation, becomes stopped against one internal surface of a casing and rotation is then permissible but in a slower fashion by the simple rotation of member 26 in member 30 which is now immobilized.

The embodiment of FIGS. 3 and 4 can likewise be used in a device such as that of FIG. 2.

Thus member 26 would replace member 18 while member 30, borne by member 26 would slide in the casing but would be fixed against rotation.

Although the invention has been described by way of particular embodiments, it is in no way limited by them and various modifications in form or in material can be made without going beyond either its scope or its intent.

We claim:

1. A device for permitting and restraining relative motion between two members comprising:
   a casing connected to one of said members, said casing comprising two abutment surfaces,
   a first element joined to the other member for sliding movement axially through said casing without rotation,
   a rotative element driven in rotation by movement of said first element and opposing movement of the first element when its rotation is restrained, said rotative element being joined to said first element so as to be placed in rotation by a movement of small acceleration of the first element and to be displaced axially when the acceleration of said first element is greater,
   an auxiliary member having abutment surfaces;
   means mounting said auxiliary members for rotation on said rotative element and for movement axially in response to axial movement of said rotative element;
   elastic means to normally maintain said rotative element in a position in which the abutment surfaces on said auxiliary member are spaced from the abutment surfaces of said casing; said elastic means deflecting in response to said greater acceleration of said first element to move said rotative element axially to a position in which one of the abutment surfaces of the auxiliary member engages one of the abutment surfaces of the casing to brake the auxiliary element;
   viscous material means between opposed surfaces of said rotative element and auxiliary member for driving said auxiliary member in rotation in response to rotation of the rotative element, said viscous material means permitting slow revolving of said rotative element relative to said auxiliary member with corresponding slow movement of said first element during braking of said auxiliary element.

2. A device according to claim 1 wherein said rotative element comprises a nut screwed on threads of the sliding element, an annular chamber being provided between said nut and said auxiliary member, said chamber being filled with said viscous material means.

3. A device according to claim 1 wherein said opposed surfaces of said rotative element and auxiliary member comprise surfaces of flanges on said rotative element and said auxiliary member.

4. A device according to claim 1, wherein a chamber having a piston is provided in one of the rotative element and auxiliary member to permit the volume of the viscous material means to change.

5. A device according to claim 1 wherein said elastic means comprises at least two springs, each spring opposing axial movement in a different direction, said springs being prestressed and bearing at one end on the casing and at the other end on a seat to maintain the prestress of the spring, so that the rotative element is displaced axially only when driven with a force greater than the prestress of the spring which opposes movement.

6. A device according to claim 1 wherein said rotative element is rotatably mounted in a bearing of the auxiliary member, said auxiliary member having an eccentric recess around said rotative element defining a volume filled with said viscous material means, said volume having a portion of slight thickness so that rotation of the rotative element produces an increase in pressure to cause friction on the bearings and a resultant increase in the resistance to relative rotation of the member and element.

7. A device according to claim 1 wherein said viscous material means comprises a silicone grease.

\* \* \* \* \*